Jan. 15, 1935.                G. S. FROST                1,988,273
                                PUZZLE
                          Filed April 23, 1932
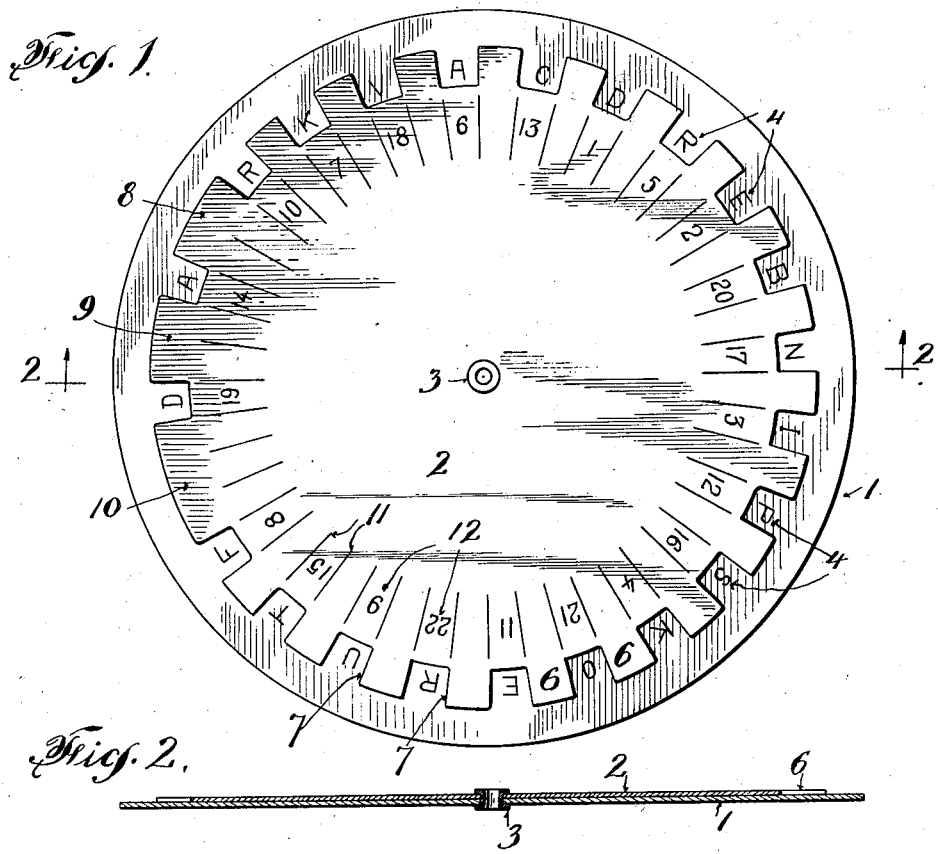
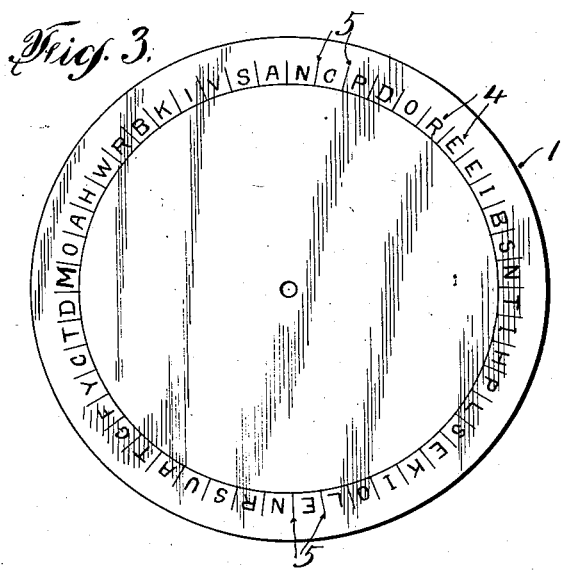
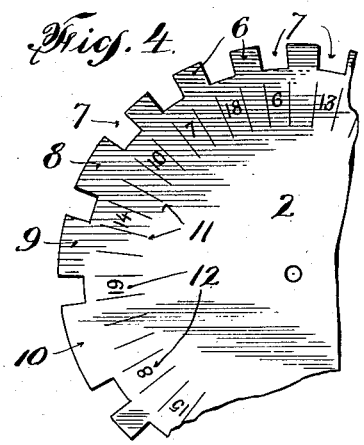
INVENTOR
George S. Frost
BY
Charles F. Newley
ATTORNEY Patented Jan. 15, 1935

1,988,273

UNITED STATES PATENT OFFICE 1,988,273

PUZZLE

George S. Frost, Baldwin, N. Y.

Application April 23, 1932, Serial No. 607,060

2 Claims. (Cl. 273—153)

My invention relates to a device which is in the nature of a puzzle. It consists of at least two relatively movable members, preferably in the form of parallel, circular discs. One of the members is provided with a series of letters, preferably arranged in a circle and the other member consists of a disc having portions for blanking out or covering certain letters on the first mentioned disc with intermediate slots for exposing certain selected letters at a time, so that according to the relative positions of the two discs various letters will be displayed which, when read around the circle, may form different words.

The object is to manipulate the discs in order to expose various combinations of letters to spell various words. The device is very useful as an advertising novelty for the purpose of attracting attention to some particular character of business. For instance, the puzzle may be arranged so that various articles of furniture may be spelled out on the puzzle and in like manner names of any articles in any line of business may be spelled out. The arrangement may be such that only certain predetermined words may be spelled by any position of the discs, thus adapting the device to the names of articles in a particular line of business.

The device has the appearance of being easily mastered, but unless one is informed of the key upon which the arrangement of letters is predetermined, the actual selection or finding of the various words by the empirical method is very difficult and requires considerable time.

It is not necessarily intended that all of the letters exposed at a given relation of the discs be employed in the formation of a word provided the letters may be selected out of all of those exposed to view for the formation of a particular word. However, it is preferable that the operator be required to find all of the letters of a given word by reading progressively in one direction once around the series of letters. For instance, the operator may be required to find all of the letters of a given word by reading progressively clockwise around the puzzle.

The present device is very simple and inexpensive to manufacture and it arouses considerable interest in view of the extreme simplicity of the article. If desired, the various letter exposing spaces of one disc may be indicated by numerals, so that a person may chart out the combinations of letters and numerals which, when registered, produce a given combination of letters to form a particular word. If the concern, for instance, distributes the device for advertising its products and offers a prize or a discount on merchandise to one finding a stated set of words on the puzzle, the person claiming to have solved the puzzle may, by charting the letters and numerals, prove the solution of the puzzle to the merchant without necessarily turning in the puzzle or physically demonstrating the solution.

While the device is valuable as an advertising medium, it will be apparent that it may be sold as a puzzle without being associated with any particular merchandise. Other advantages and features will be set forth in the following detailed description.

In the drawing forming part of this application.

Figure 1 is a face view of a puzzle embodying my invention in the preferred form, Figure 2 is a sectional view taken on the line 2—2 of Figure 1, Figure 3 is a face view of the disc which carries the several letters, and Figure 4 is a face view of a portion of the disc which is provided with the means for blanking out various letters and exposing others.

The invention is shown with a layout of letters and exposing spaces plotted to permit various pieces of furniture to be spelled out. In the arrangement illustrated, twenty-five words, all relating to or allied with the furniture business, may be spelled out on the puzzle. It will be apparent, however, that the names of articles in any particular line of business may be spelled by having the discs plotted for the particular words desired, so that in describing the puzzle as laid out for the names of articles of furniture I do so only by way of illustrating one use of the invention and not with any intention of limiting the same to the particular combinations described.

I have shown the relatively movable members in the form of discs, one of which numbered 1, is circular and forms a back or rear member of the combination; and it is preferably larger in diameter than the front or covering disc. The covering disc indicated as 2 is placed concentric with the rear disc 1 and preferably in parallel relation thereto, so that the two discs lie face to face. They are preferably mounted to revolve in relation to each other by being pivotally arranged on a central eyelet 3 which connects the discs together at the center and permits one to be revolved in relation to the other. The two discs and the central eyelet form the mechanical members which complete the device.

The rear disc, 1 is provided with a number of letters of the alphabet as indicated at 4 and these are preferably arranged in circular form concentric with the eyelet 3 which attaches the discs together. Preferably, these various letters are all arranged uniform distances apart around the circle and I have shown by radial lines 5 between the letters the individual spaces all of equal width, each space containing a single letter. These letters 4 are not arranged in alphabetical order around the circle but are plotted and disposed in accordance with the predetermined plan as hereinafter referred to. Generally there will be a repetition of different letters around the circle in order to permit various combinations of letters to be obtained for spelling different words.

The front or exposing disc 2 is provided with a number of peripheral extensions 6 extending outwardly from the disc in spoke-like formation; and between the several projections are formed openings or slots 7 each of which is adapted to expose to view a single letter in the circle 4 of the rear disc, and therefore I have shown these slots of a width corresponding with the spacing between the radial marking lines 5 on the disc 1. While I prefer to make each of the slots 7 of equal width it is preferable that at least some of the projections be wider than others, generally a multiple of the width of the narrowest projections in order to make the solution of the puzzle more difficult and fascinating.

In the example illustrated in the drawing I have shown the greater portion of the projections of equal width and corresponding with the space between the adjacent markings 5 of the rear disc. One projection, indicated as 8 is twice the width of the projections 6 so that it will cover up two adjacent letters 4. This is true, also of the projection 9.

I have also shown a projection 10 which is three times the width of the first mentioned projection 6 so that the projection 10 will cover up three adjacent letters 4 at a time.

In using the puzzle the discs will be moved relatively to each other, and for convenience the larger or rear disc may be held in one hand while the front disc is turned with the other hand. The front disc may be turned to different positions bringing the slots 7 of the front disc to register with the radial lines 5 of the rear disc, whereupon various letters around the circle will be exposed to view through the various slots 7 between the projections on the front disc.

The operator will then start to read the letters beginning at any point, such as from the wider extension 10, reading the exposed letters clockwise and selecting certain letters for use and dropping others, to determine whether a particular word can be spelled out from the exposed letters while the discs are set in a given position. If no word can be spelled out from the exposed letters, the front disc may be moved to a new position and the operation repeated. In order to facilitate the charting of the positions of the discs when a given word is spelled out, I have arranged a series of radial lines 11 on the front disc, corresponding with the edges of the several projections 6, 8, 9, 10 and the spaces between these radial lines corresponding with the slots 7 have been designated by various numerals 12 which are, preferably, not arranged in numerical order but scattered about irregularly, as shown in Figures 1 and 4.

The plotting of the letters on the rear disc 1 in the drawing has been arranged to permit the spelling of twenty-five words representing articles of furniture. By way of example, the discs are shown as positioned in Figure 1 for the spelling of the word Davenport.

Starting to read from the projection 10 in clockwise direction, it will be observed that the slot indicated by the numeral 19 is opposite the letter D, so that the letter is exposed to view. By reading around the discs it will be found that the next letter, exposed through the slot 14, is A; likewise, the letter V is exposed at slot 18; the letter E is exposed at slot 2; the letter N at slot 17; the letter P at slot 12; the letter O at slot 21; the letter R at slot 22; and the letter T at slot 15, thus completing the spelling of the word Davenport.

It will be noted that in spelling out this word certain letters of all those exposed have been selected while reading progressively clockwise around the circle, whereas other letters exposed and which are not necessary to the spelling of the word have been ignored.

The operator having succeeded in forming the word Davenport, he or she may chart the position of the discs with this word spelled out, either for the purpose of being able to again return the dials to the same position or for the purpose of proving that the operator has successfully spelled this word out. When the words have been charted in this manner, if a prize or discount has been offered to those forming the maximum number of words on the device, the operator may send in the chart with the positions plotted and receive a prize or discount. On the other hand, if the device is used like a game, the charting may be followed in order to prove that the particular operator has succeeded in forming the several words. The following is a key by which twenty-five words all representing articles of furniture may be spelled out in the manner just described in connection with the word Davenport if the letters are arranged in the manner shown in Figure 3 and if the projections 6, 8, 9, 10 on the front disc are proportioned and arranged as shown in Figures 1 and 4.

T A B L E      B E N C H
14 6 1 22 9      14 1 2 15 19

C L O C K      C A R P E T
11 14 7 2 16      18 17 16 9 19 10

S T O V E      S H A D E S
14 20 16 22 19      18 4 9 8 19 14

D R A P E S      C H A I R
11 15 19 14 7 5      19 10 13 12 9

L A M P      P I L L O W
12 9 19 13      1 20 16 11 14 10

S P R I N G      D I S H E S
8 19 14 10 20 12      14 7 18 13 5 3

R U G      C H E S T
3 19 14      14 1 2 12 11

C A B I N E T      C H I N A
14 7 6 13 5 17 16      14 1 20 3 16

C O U C H      S O F A
19 14 3 4 22      16 21 8 14

B E D      V A N I T Y
14 1 8      1 5 16 4 19 14

D R E S S E R      D E S K
12 21 19 14 18 1 5      12 19 14 6

P I A N O      R A D I O
14 7 3 11 9      19 14 18 11 8

D A V E N P O R T
19 14 18 2 17 12 21 22 15

Inasmuch as the circle of letters 4 on the rear disc generally contains repetitions of the same letter, it requires more or less manipulation of the discs in order to spell out the several words. For instance, in the spelling of the word Davenport as shown in Figure 1, the slot 19 is registered with the letter D. If the slot 19 were registered with a different letter D in the circle 4, the word Davenport could not be spelled out. It is obvious that the operator will have to manipulate the discs many times to spell out a set of words. I estimate that if the operator is not provided with the key it will take several hours to spell out the twenty-five words given in the above key. By having some of the projections on the forward disc of multiple width it increases the difficulty of spelling out the words.

As stated above, the device is very simple in construction. While apparently simple to operate, considerable time is required to position the discs for the spelling of different words, so that what appears to be a simple matter proves to be difficult and therefore fascinating. Various changes may be made in the construction and arrangement of the device without departing from the scope of the annexed claims.

Having described my invention, what I claim is:

1. A device of the class described, including relatively revolvable discs, one of which has letters circularly arranged and in non-alphabetical sequence, the other of said discs having portions forming teeth for simultaneously covering some of the letters of said first mentioned disc and having intervening spaces to simultaneously expose certain of the letters on said first disc, said second disc having teeth which are a multiple of the width of said first teeth, and having still another tooth or teeth having a width of a greater multiple of said first teeth.

2. A device of the class described, including relatively revolvable discs, one of which has letters circularly arranged and in non-alphabetical sequence, the other of said discs having portions forming teeth for simultaneously covering some of the letters of said first mentioned disc and having intervening spaces to simultaneously expose certain of the letters of said first disc, said second disc having teeth which are a multiple of the width of said first teeth, and having still another tooth or teeth adjacent thereto having a width of a greater multiple of said first teeth.

GEORGE S. FROST.